United States Patent
Gupta et al.

(10) Patent No.: US 7,251,694 B2
(45) Date of Patent: *Jul. 31, 2007

(54) PEER-TO PEER NAME RESOLUTION PROTOCOL (PNRP) SECURITY INFRASTRUCTURE AND METHOD

(75) Inventors: Rohit Gupta, Redmond, WA (US); Alexandru Gavrilescu, Redmond, WA (US); John L. Miller, Woodinville, WA (US); Graham A. Wheeler, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/375,748

(22) Filed: Mar. 15, 2006

(65) Prior Publication Data
US 2006/0161657 A1    Jul. 20, 2006

Related U.S. Application Data

(62) Division of application No. 10/134,780, filed on Apr. 29, 2002, now Pat. No. 7,051,102.

(51) Int. Cl.
*G06F 15/16* (2006.01)

(52) U.S. Cl. ............... 709/226; 709/235; 709/238; 707/9; 711/141

(58) Field of Classification Search ........... 709/203, 709/224, 226, 238; 707/9, 10; 711/141, 711/146

See application file for complete search history.

(56) References Cited

U.S. PATENT DOCUMENTS 5,793,365 A    8/1998    Tang et al.
5,822,762 A *  10/1998   Nishida et al. .......... 711/139

(Continued)

FOREIGN PATENT DOCUMENTS

EP    1 248 441 A2    10/2002

(Continued)

OTHER PUBLICATIONS

Partial European Search Report for EP 03 00 7907, dated Jun. 21, 2005.

(Continued)

*Primary Examiner*—Khanh Dinh
(74) *Attorney, Agent, or Firm*—Marshall, Gerstein & Borun LLP

(57) ABSTRACT

A security infrastructure and methods are presented that inhibit the ability of a malicious node from disrupting the normal operations of a peer-to-peer network. The methods of the invention allow both secure and insecure identities to be used by nodes by making them self-verifying. When necessary or opportunistic, ID ownership is validated by piggybacking the validation on existing messages. The probability of connecting initially to a malicious node is reduced by randomly selecting to which node to connect. Further, information from malicious nodes is identified and can be disregarded by maintaining information about prior communications that will require a future response. Denial of service attacks are inhibited by allowing the node to disregard requests when its resource utilization exceeds a predetermined limit. The ability for a malicious node to remove a valid node is reduced by requiring that revocation certificates be signed by the node to be removed.

20 Claims, 6 Drawing Sheets

U.S. PATENT DOCUMENTS

| | | | |
|---|---|---|---|
| 5,987,376 | A | 11/1999 | Olson et al. |
| 6,038,296 | A | 3/2000 | Brunson et al. |
| 6,223,255 | B1* | 4/2001 | Argade .................. 711/129 |
| 6,233,606 | B1 | 5/2001 | Dujari |
| 6,397,303 | B1 | 5/2002 | Arimilli et al. |
| 6,405,290 | B1* | 6/2002 | Arimilli et al. ............ 711/146 |
| 6,941,366 | B2 | 9/2005 | Antes et al. |
| 6,941,384 | B1 | 9/2005 | Aiken, Jr. et al. |
| 2002/0032592 | A1 | 3/2002 | Krasnick et al. |
| 2002/0143989 | A1 | 10/2002 | Huitema et al. |
| 2002/0156875 | A1 | 10/2002 | Pabla |
| 2003/0018813 | A1 | 1/2003 | Antes et al. |
| 2003/0037178 | A1* | 2/2003 | Vessey et al. ............... 709/319 |
| 2003/0097410 | A1 | 5/2003 | Atkins et al. |
| 2003/0158864 | A1 | 8/2003 | Samn |
| 2003/0196060 | A1 | 10/2003 | Miller |
| 2004/0145608 | A1 | 7/2004 | Fay et al. |
| 2004/0193827 | A1* | 9/2004 | Mogi et al. ................. 711/170 |
| 2005/0004985 | A1 | 1/2005 | Stochosky |
| 2005/0027581 | A1 | 2/2005 | Kjesbu et al. |
| 2005/0027800 | A1 | 2/2005 | Erickson et al. |

FOREIGN PATENT DOCUMENTS

| | | |
|---|---|---|
| WO | WO-02084948 | 10/2002 |
| WO | WO-2005029372 | 3/2005 |

OTHER PUBLICATIONS

Kim et al., "A Secure Platform for Peer-to-Peer Computing in the Internet," Proceedings of the 35th Hawaii International Conference on System Sciences, IEEE Computer Society, 2002, pp. 3948-3957.

Mazieres et al., "Separating Key Management from File System Security," Operating Systems Review ACM, vol. 33, No. 5, Dec. 1999, pp. 124-139.

Ajmani et al., "ConChord: Cooperative SDSI Certificate Storage and Name Resolution," First International Workshop on Peer-to-Peer Systems (IPTPS), Mar. 2002.

Dabek, F., et al.,Building Peer-to-Peer Systems With Chord, a Distributed Lookup Serivce, at MIT Laboratory for Computer Science, 6 pages, at http://pdos.Ics.mit.edu/chord.

Druschel, P., et al., PAST: A large-scale, persistent peer-to-peer storage utility, at Rice University and Microsoft Research, 6 pages.

Ellison, C., et al., Simple Public Key Certificate, (Internet Draft 1999), at http://www.world.std.com/~cme/spki.txt (Aug. 6, 2001).

Ellison, C., et al., SPKI Certificate Theory, (The Internet Society 1999), at http://www.ietf.org/rfc/rfc2693.txt?number =2693 (Aug. 6, 2001).

Ellison, C., SPKI Requirements, (The Internet Society 1999), at http://www.ietf.org/rfc/rfc2692.txt?number=2692 (Aug. 6, 2001).

Erdelsky, P., The Birthday Paradox, EFG, at http://www.efgh.com/math/birthday.htm (Mar. 8, 2002).

Lai, K. et al., Measuring Link Bandwidths Using a Deterministic Model of Packet Delay, at Department of Computer Science at Stanford University, 13 pages.

Langley, A., The Freenet Protocol, The Free Network Project, at http://freenet.sourceforge.net/index/php?page=protocol (May 21, 2001).

Red-Black Tree, National Institute of Standards and Technology, at http://www.nist.gov/dads/HTML/redblack.html (Mar. 5, 2002).

Rowstron et al., Pastry: Scalable, distributed object location and routing for large-scale peer-to-peer systems, at Microsoft Research, Ltd., St. George House and Rice University, 20 pages.

Rowstron et al., SCRIBE: The design of a large-scale event notification infrastructure, at Microsoft Research, Ltd., St. George House and Rice University, 20 pages.

Rowstron et al., Storage management and caching in PAST, a large-scale, persistent peer-to-peer storage utility, at Microsoft Research, Ltd., St. George House and Rice University, 14 pages.

Perey, et al, "Working Together in Virtual Facilities," NetworkWorld Website, 7 pages printed Jul. 1, 2005 from http://www.networkworld.com/reviews/2003/0728bgmain.html.

"Collaborative Program Management for the 21st Century Enterprise," Paragon Dynamics, 4 pages printed Jul. 5, 2005 from <http://www.paragondynamics.com/dynamic/marketing/>PACE_Feature_3_single_page.pdf.

"Live Meeting Overview," 3 pages printed Jul. 1, 2005 from <http://www.microsoft.com/office/livemeeting/prodinfo/overview.mspx>.

"FVC Launces Click to Meet Express 2.0," The Wainhouse Research Bulletin, Apr. 22, 2003, vol. 4, #17 (3 pages).

"SAIC Collaboration System: Knowledge Through Distributed Interaction," 8 pages printed Jul. 1, 2005 from <http://www.saic.com/products/software/collaboration/scs.pdf>.

"Arel Spotlight Application Suite," 11 pages printed Jul. 1, 2005 from http://www.arelcom.com/conferencing.html.

* cited by examiner

PEER-TO PEER NAME RESOLUTION PROTOCOL (PNRP) SECURITY INFRASTRUCTURE AND METHOD

This is a divisional of U.S. application Ser. No. 10/134,780, filed Apr. 29, 2002, now U.S. Pat. Ser. No. 7,051,102, the entire disclosure of which is incorporated herein by reference.

FIELD OF THE INVENTION

The present invention relates generally to peer-to-peer protocols, and more particularly to security framework infrastructures for peer-to-peer protocols.

BACKGROUND OF THE INVENTION

Peer-to-peer (P2P) communication, and in fact all types of communication, depend on the possibility of establishing valid connections between selected entities. However, entities may have one or several addresses that may vary because the entities move in the network, because the topology changes, or because an address lease cannot be renewed. A classic architectural solution to this addressing problem is thus to assign to each entity a stable name, and to "resolve" this name to a current address when a connection is needed. This name to address translation must be very robust, and it must also allow for easy and fast updates.

To increase the likelihood that an entity's address may be found by those seeking to connect to it, many peer-to-peer protocols, including the Peer Name Resolution Protocol (PNRP), allow entities to publish their address through various mechanisms. Some protocols also allow a client to acquire knowledge of other entities' addresses through the processing of requests from others in the network. Indeed, it is this acquisition of address knowledge that enables successful operation of peer-to-peer networks. That is, the better the information about other peers in the network, the greater the likelihood that a search for a particular resource will converge.

However, without a robust security infrastructure underlying the peer-to-peer protocol, malicious entities can easily disrupt the ability for such peer-to-peer systems to converge. Such disruptions may be caused, for example, by an entity that engages in identity theft. In such an identity theft attack on the peer-to-peer network, a malicious node publishes address information for identifications (IDs) with which it does not have an authorized relationship, i.e. it is neither the owner nor a group member, etc. A malicious entity could also intercept and/or respond first before the good node responds, thus appearing to be the good node.

Commonly, P2P network attacks may attempt to disrupt or exhaust node or network resources. In PNRP, a malicious entity could also obstruct PNRP resolution by flooding the network with bad information so that other entities in the network would tend to forward requests to nonexistent nodes (which would adversely affect the convergence of searches), or to nodes controlled by the attacker. PNRP's name resolution ability could also be degraded by modifying the RESOLVE packet used to discover resources before forwarding it to a next node, or by sending an invalid RESPONSE to back to the requester that generated the RESOLVE packet. A malicious entity could also attempt to disrupt the operation of the peer-to-peer network by trying to ensure that searches will not converge by, for example, instead of forwarding the search to a node in its cache that is closer to the ID to aid in the search convergence, forwarding the search to a node that is further away from the requested ID. Alternatively, the malicious entity could simply not respond to the search request at all. The PNRP resolution could be further hampered by a malicious node sending an invalid BYE message on behalf of a valid ID. As a result, other nodes in the cloud will remove this valid ID from their cache, decreasing the number of valid nodes stored therein.

While simply validating address certificates may prevent the identity theft problem, such is ineffective against an attack that impedes PNRP resolution. An attacker can continue to generate verifiable address certificates (or have them pre-generated) and flood the corresponding IDs in the peer-to-peer cloud. If any of the nodes attempts to verify ownership of the ID, the attacker would be able to verify that it is the owner for the flooded IDs because, in fact, it is. However, if the attacker manages to generate enough IDs it can bring most of the peer-to-peer searches to one of the nodes it controls. Once a malicious node brings the search to controlled node, the attacker fairly controls and directs the operation of the network.

A malicious node may also attempt a denial of service (DoS) attack. When a P2P node changes, it may publish its new information to other network nodes. If all the nodes that learn about the new node records try to perform an ID ownership check, a storm of network activity against the advertised ID owner will occur. Exploiting this weakness, an attacker could mount an internet protocol (IP) DoS attack against a certain target by making that target very popular. For example, if a malicious entity advertises an Internet Website IP address as the updated node's ID IP, all the nodes in the peer-to-peer network that receive this advertised IP will try to connect to that IP to verify the authenticity of the record. Of course, the Website's server will not be able to verify ownership of the ID because the attacker generated this information. However, the damage has already been done. That is, the attacker convinced a good part of the peer-to-peer community to flood the IP address with validation requests and may have effectively shut it down.

Another type of DoS attack that overwhelms a node or a cloud by exhausting one or more resources occurs when a malicious node sends a large volume of invalid/valid peer address certificates (PACs) to a single node (e.g. by using FLOOD/RESOLVE/SOLICIT packets). The node that receives these PACs will consume all its CPU trying to verify all of the PACs. Similarly, by sending invalid FLOOD/RESOLVE packets, a malicious node will achieve packet multiplication within the cloud. That is, the malicious node can consume network bandwidth for a PNRP cloud using a small number of such packets because the node to which these packets are sent will respond by sending additional packets. Network bandwidth multiplication can also be achieved by a malicious node by sending bogus REQUEST messages to which good nodes will respond by FLOODing the PACs, which are of a larger size than the REQUEST.

A malicious node can also perpetrate an attack in the PNRP cloud by obstructing the initial node synch up. That is, to join the PNRP cloud a node tries to connect to one of the nodes already present in the PNRP cloud. If the node tries to connect to the malicious node, it can be completely controlled by that malicious node. Further, a malicious node can send invalid REQUEST packets when two good nodes are involved in the synchronization process. This is a type of DoS attack that will hamper the synch up. Because the invalid REQUEST packets generate FLOOD messages in response, initial node synch up may be hindered.

There exists a need in the art, therefore, for security mechanisms that will ensure the integrity of the P2P cloud by preventing or mitigating the effect of such attacks.

BRIEF SUMMARY OF THE INVENTION

The inventive concepts disclosed in this application involve a new and improved method for inhibiting a malicious node's ability to disrupt normal operation of a peer-to-peer network. Specifically, the present invention presents methods to address various types of attacks that may be launched by a malicious node, including identity theft attacks, denial of service attacks, attacks that merely attempt to hamper the address resolution in the peer-to-peer network, as well as attacks that attempt to hamper a new node's ability to join and participate in the peer-to-peer network.

The security infrastructure and methods presented allow both secure and insecure identities to be used by nodes by making them self-verifying. When necessary or opportunistic, ID ownership is validated by piggybacking the validation on existing messages or, if necessary, by sending a small inquire message. The probability of connecting initially to a malicious node is reduced by randomly selecting the connection node. Further, information from malicious nodes is identified and can be disregarded by maintaining information about prior communications requiring a future response. Denial of service attacks are inhibited by allowing the node to disregard requests when its resource utilization exceeds a predetermined limit. The ability for a malicious node to remove a valid node is reduced by requiring revocation certificates to be signed by the node to be removed.

In accordance with one embodiment of the present invention, a method of generating a self-verifiable insecure peer address certificate (PAC) that will prevent a malicious node from publishing another node's secure identification in an insecure PAC in the peer-to-peer network is presented. This method comprises the steps of generating an insecure PAC for a resource discoverable in the peer-to-peer network. The resource has a peer-to-peer identification (ID). The method further includes the step of including a uniform resource identifier (URI) in the insecure PAC from which the peer-to-peer ID is derived. Preferably, the URI is in the format "p2p://URI". The peer-to-peer ID may also be insecure.

In a further embodiment, a method of opportunistically validating a peer address certificate at a first node in a peer-to-peer network is presented. This first node utilizes a multilevel cache for storage of peer address certificates, and the method comprises the steps of receiving a peer address certificate (PAC) purportedly from a second node and determining the PAC storage level in the multilevel cache. When the PAC is to be stored in one of two lowest cache levels, the method places the PAC in a set aside list, generates an INQUIRE message containing an ID of the PAC to be validated, and transmits the INQUIRE message to the second node. When the PAC is to be stored in an upper cache level other than one of the two lowest cache levels, the method stores the PAC in the upper cache level marked as 'not validated'. In this case, the PAC will be validated the first time it is used. The method may also request a certificate chain for the PAC.

In a preferred embodiment, creating of the INQUIRE message comprises the step of generating a transaction ID to be included in the INQUIRE message. When an AUTHORITY message is received from the second node in response to the INQUIRE message, the PAC is removed from the set aside list and is stored in one of the two lowest cache levels. If a certificate chain was requested, the AUTHORITY message is examined to determine if the certificate chain is present and valid. If the AUTHORITY is present and valid, the PAC is stored in the one of the two lowest cache levels, and if not, it is deleted. A transaction ID may also be used in an embodiment of the invention to ensure that the AUTHORITY message is in response to a prior communication.

In a further embodiment of the present invention, a method of discovering a node in a peer-to-peer network in a manner that reduces the probability of connecting to a malicious node is presented. This method comprises the steps of broadcasting a discovery message in the peer-to-peer network without including any IDs locally registered, receiving a response from a node in the peer-to-peer network, and establishing a peering relationship with the node. In one embodiment, the step of receiving a response from a node comprises the step of receiving a response from at least two nodes in the peer-to-peer network. In this situation, the step of establishing a peering relationship with the node comprises the steps of randomly selecting one of the at least two nodes and establishing a peering relationship with the randomly selected one of the at least two nodes.

In yet a further embodiment of the present invention, a method of inhibiting a denial of service attack based on a synchronization process in a peer-to-peer network is presented. This method comprises the steps of receiving a SOLICIT message requesting cache synchronization from a first node containing a peer address certificate (PAC), examining the PAC to determine its validity, and dropping the SOLICIT packet when the step of examining the PAC determines that the PAC is not valid. Preferably, when the step of examining the PAC determines that the PAC is valid, the method further comprises the steps of generating a nonce, encrypting the nonce with a first node public key of the first node, generating an ADVERTISE message including the encrypted nonce, and sending the ADVERTISE message to the first node. When a REQUEST message is received from the first node, the method examines the REQUEST message to determine if the first node was able to decrypt the encrypted nonce, and processes the REQUEST message when the first node was able to decrypt the encrypted nonce.

Preferably, this method further comprises the steps of maintaining connection information specifically identifying the communication with the first node, examining the REQUEST message to ensure that it is specifically related to the ADVERTISE message, and rejecting the REQUEST message when it is not specifically related to the ADVERTISE message. In one embodiment, the step of maintaining connection information specifically identifying the communication with the first node comprises the steps of calculating a first bitpos as the hash of the nonce and the first node's identity, and setting a bit at the first bitpos in a bit vector. When this is done, the step of examining the REQUEST message comprises the steps of extracting the nonce and the first node's identity from the REQUEST message, calculating a second bitpos as the hash of the nonce and the first node's identity, examining the bit vector to determine if it has a bit set corresponding to the second bitpos, and indicating that the REQUEST is not specifically related to the ADVERTISE message when the step of examining the bit vector does not find a bit set corresponding to the second bitpos. Alternatively, the nonce may be used directly as the bitpos. In this case, when the REQUEST is received, the bitpos corresponding to the enclosed nonce is checked. If it is set, this is a valid REQUEST and the bitpos is cleared. Otherwise, this is an invalid REQUEST or replay attack, and the REQUEST is discarded.

In yet a further embodiment of the present invention, a method of inhibiting a denial of service attack based on a synchronization process in a peer-to-peer network comprises the steps of receiving a REQUEST message purportedly from a first node, determining if the REQUEST message is in response to prior communication with the first node, and rejecting the REQUEST message when the REQUEST message is not in response to prior communication with the first node. Preferably, the step of determining if the REQUEST message is in response to prior communication comprises the steps of extracting a nonce and an identity purportedly of the first node from the REQUEST message, calculating a bitpos as the hash of the nonce and the identity, examining a bit vector to determine if it has a bit set corresponding to the bitpos, and indicating that the REQUEST is not in response to prior communication with the first node when there is no bit set corresponding to the bitpos.

A method of inhibiting denial of service attacks based on node resource consumption in a peer-to-peer network is also presented. This method comprises the steps of receiving a message from a node in the peer-to-peer network, examining current resource utilization, and rejecting processing of the message when the current resource utilization is above a predetermined level. When a RESOLVE message is received, the step of rejecting processing of the message comprises the step of sending an AUTHORITY message to the first node. This AUTHORITY message contains an indication that the RESOLVE message will not be processed because the current resource utilization too high. When a FLOOD message is received containing a peer address certificate (PAC) and the method determines that the PAC should be stored in one of two lowest cache levels, the step of rejecting processing of the message comprises the step of placing the PAC in a set aside list for later processing. If the method determines that the PAC should be stored in a cache level higher than two lowest cache levels, the step of rejecting processing of the message comprises the step of rejecting the FLOOD message.

In another embodiment of the present invention, a method of inhibiting denial of service attacks based on node bandwidth consumption in a peer-to-peer network is presented. This method comprises the steps of receiving a request for cache synchronization from a node in the peer-to-peer network, examining a metric indicating a number of cache synchronizations performed in the past, and rejecting processing of the request for cache synchronization when the number of cache synchronizations performed in the past exceeds a predetermined maximum. In a further embodiment, the method examines the metric to determine the number of cache synchronizations performed during a predetermined preceding period of time. In this embodiment the step of rejecting processing of the request comprises the step of rejecting processing of the request for cache synchronization when the number of cache synchronizations performed in the preceding period of time exceeds a predetermined maximum.

In another embodiment of the present invention, a method of inhibiting a search based DoS attack in a peer-to-peer network comprises the steps of examining cache entries of known peer address certificates to determine appropriate nodes to which to send a resolution request, randomly selecting one of the appropriate nodes, and sending the resolution request to the randomly selected node. In one embodiment the step of randomly selecting one of the appropriate nodes comprises the step of calculating a weighted probability for each of the appropriate nodes based on the distance of the PNRP ID from the target ID. The probability of choosing a specific next hop is then determined as an inverse proportionality to the ID distance between that node and the target node.

In a further embodiment of the present invention, a method of inhibiting a search based denial of service attack in a peer-to-peer network comprises the steps of receiving a RESPONSE message, determining if the RESPONSE message is in response to a prior RESOLVE message, and rejecting the RESPONSE message when the RESPONSE message is not in response to the prior RESOLVE message. Preferably, the step of determining if the RESPONSE message is in response to a prior RESOLVE message comprises the steps of calculating a bitpos as a hash of information in the RESPONSE message, and examining a bit vector to determine if a bit corresponding to the bitpos is set therein.

In one embodiment wherein the RESPONSE message contains an address list, the method further comprises the steps of determining if the RESPONSE message has been modified in an attempt to hamper resolution, and rejecting the RESPONSE message when the RESPONSE message has been modified in an attempt to hamper resolution. Preferably the step of determining if the RESPONSE message has been modified in an attempt to hamper resolution comprises the steps of calculating a bitpos as a hash of the address list in the RESPONSE message, and examining a bit vector to determine if a bit corresponding to the bitpos is set therein.

In another embodiment of the present invention, a method of inhibiting a malicious node from removing a valid node from the peer-to-peer network comprises the steps of receiving a revocation certificate purportedly from the valid node having a peer address certificate (PAC) stored in the receiving node cache, and verifying that the revocation certificate is signed by the valid node.

BRIEF DESCRIPTION OF THE DRAWINGS

The accompanying drawings incorporated in and forming a part of the specification illustrate several aspects of the present invention, and together with the description serve to explain the principles of the invention. In the drawings.

Figure 1:
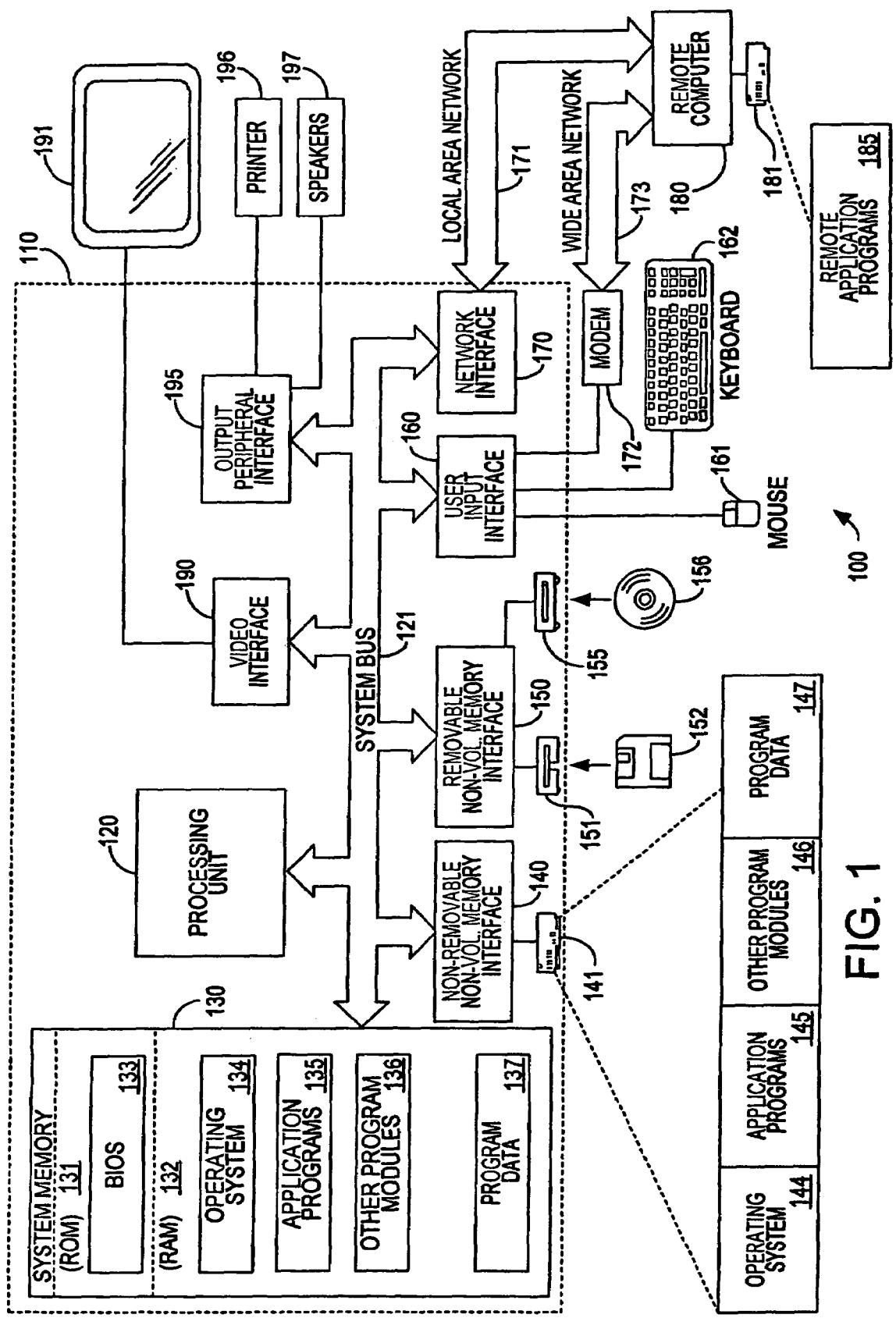
FIG. 1 is a block diagram generally illustrating an exemplary computer system on which the present invention resides.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 10. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 195.

The computer 110 may operate in a networked environment using logical connections to one or more remote computers, such as a remote computer 180. The remote computer 180 may be another personal computer, a server, a router, a network PC, a peer device or other common network node, and typically includes many or all of the elements described above relative to the personal computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the personal computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the personal computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

As introduced above, the success of a peer-to-peer (P2P) protocol depends on the protocol's ability to establish valid connections between selected entities. Because a particular user may connect to the network in various ways at various locations having different addresses, a preferred approach is to assign a unique identity to the user, and then resolve that identity to a particular address through the protocol. Such a peer-to-peer name resolution protocol (PNRP) to which the security infrastructure of the instant invention finds particular applicability is described in co-pending application Ser. No. 09/942,164, entitled Peer-To-Peer Name Resolution Protocol (PNRP) And Multilevel Cache For Use Therewith, filed on Aug. 29, 2001, the teachings and disclosure of which are hereby incorporated in their entireties by reference thereto. However, one skilled in the art will recognize from the following teachings that the security infrastructure and methods of the present invention are not limited to the particular peer-to-peer protocol of this co-pending application, but may be applied to other protocols with equal force.

As discussed in the above-incorporated co-pending application, the peer name resolution protocol (PNRP) is a peer-based name-to-address resolution protocol. Names are 256-bit numbers called PNRP IDs. Addresses consist of an IPv4 or IPv6 address, a port, and a protocol number. When a PNRP ID is resolved into an address, a peer address certificate (PAC) is returned. This certificate includes the target's PNRP ID, current IP address, public key, and many other fields. An instance of the PNRP protocol is called a node. A node may have one or more PNRP IDs registered locally. A node makes an ID-to-address mapping discoverable in PNRP via registration. Each registration includes a locally constructed peer certificate, and requires an appropriate view of the PNRP cache. Hosts which are not PNRP nodes may resolve PNRP IDs into IP addresses via a PNRP DNS gateway. A PNRP DNS gateway accepts DNS 'A' and 'AAAA' queries, performs a PNRP search for a subset of the hostname specified, and returns the results as a DNS query answer.

As indicated above, PNRP provides a peer-based mechanism associating P2P and PNRP IDs with peer address certificates (PACs). A P2P ID is a persistent 128-bit identifier. P2P IDs are created by hashing a correctly formatted P2P name. There are two types of P2P IDs, secure and insecure. A secure P2P ID is an ID with a verifiable relationship to a public key. An insecure P2P ID is any ID which is not secure. A given P2P ID may be published by many different nodes. PNRP uses a 'service location' suffix to ensure each published instance has a unique PNRP ID. A 'service location' is a 128-bit number corresponding to a unique network service endpoint. Service locations have some recognizable elements, but should be considered opaque by PNRP clients. A service location has two important properties. At any moment, only one socket in the cloud corresponds to a given service location. When two service locations are compared, the length of the common prefix for each is a reasonable measure of network proximity. Two service locations which start with the same four bits are no further apart than two which start with the same three bits.

A P2P ID is uniquely identified by its catenation with the service location. The resulting 256-bit (32 byte) identifier is called a PNRP ID. PNRP nodes register a PNRP ID by invoking PNRP services with a P2P name, authority, and several other parameters. PNRP services then creates and maintains a Peer Address Certificate (PAC) containing the submitted data. PACs include at a minimum a PNRP ID, certificate validity interval, service and PNRP address, public key, and a cryptographic signature generated over select PAC contents.

Creation and registration of PNRP IDs is only one part of the PNRP service. The PNRP service execution can be divided into four phases. The first is PNRP cloud discovery. During this phase a new node must find an existing node in the cloud it wishes to join. The cloud may be the global PNRP cloud, a site local (enterprise) cloud, or a link local cloud. Once found, the second phase of joining a PNRP cloud is entered. Once the new node has found an existing node, it performs a SYNCHRONIZE procedure to obtain a copy of the existing node's top cache level. A single cache level provides enough basis for a new node to start participating in the cloud. Once the SYNCHRONIZATION has been achieved, the next phase, active participation in the cloud, may be begun. After initialization has completed, the node may participate in PNRP ID registration and resolution. During this phase, the peer also performs regular cache maintenance. When the node is done, it enters the fourth phase, leaving the cloud. The node un-registers any locally registered PNRP IDs, then terminates.

The PNRP protocol consists of nine different types of packets, some of which have been introduced above. It should be noted, however, that in this application the names of the packets are used merely to facilitate an understanding of their functionality, and should not be taken as limiting the form or format of the packet or message itself. The RESOLVE packet requests resolution of a target PNRP ID into a PAC. A RESPONSE packet is the result of a completed RESOLVE request. The FLOOD packet contains a PAC intended for the PNRP cache of the recipient. A SOLICIT packet is used to ask a PNRP node to ADVERTISE its top level cache. The requested ADVERTISE packet contains a list of PNRP IDs for PACs in a node's top level cache. A REQUEST packet is used to ask a node to flood a subset of ADVERTISE'd PACs. An INQUIRE packet is used to insecurely ask a node whether a specific PNRP ID is registered at that node. To confirm local registration of a PNRP ID, an AUTHORITY packet is used. This packet optionally provides a certification chain to help validate the PAC for that ID. An ACK packet acknowledges receipt and/or successful processing of certain messages. Finally, the REPAIR packet is used to try to merge clouds that may be split.

Once a node is fully initialized, it may participate in the PNRP cloud by performing five types of activities. First, a node may register and un-register PNRP IDs. When a PNRP ID is registered, the PNRP service creates a peer address certificate (PAC) associating the PNRP ID, service address port and protocol, PNRP address port and protocol, and a public key. This PAC is entered into the local cache, and a RESOLVE is initiated using the new PAC as the source, and [PNRP ID+1] as the target. This RESOLVE is processed by a number of nodes with PNRP IDs very similar to the registered ID. Each recipient of the RESOLVE adds the new node's PAC to their cache, thereby advertising the new PNRP ID in the cloud. When a PNRP ID is unregistered, an updated PAC is created with a 'revoke' flag set. The updated PAC is flooded to all entries in the lowest level of the local cache. Each recipient of the FLOOD checks its cache for an older version of the PAC. If one is found, the recipient removes the PAC from its cache. If the PAC is removed from the lowest cache level, the recipient in turn FLOODs the revocation to the PNRP nodes represented by all other PACs in its lowest cache level.

The PNRP node may also participate in PNRP ID resolution. As discussed in the above incorporated application, PNRP IDs are resolved into PACs by routing RESOLVE messages successively closer to the target PNRP ID. When a node receives a RESOLVE, it may reject the RESOLVE back to the previous hop, respond to the previous hop with a RESPONSE, or forward the RESOLVE to a node whose PNRP ID is closer to the target ID than the node's own. The node also receives and forwards RESPONSE packets as part of resolution. The PNRP node may also initiate RESOLVEs on behalf of a local client. The PNRP service provides an API to allow asynchronous resolution requests. The local node originates RESOLVE packets, and eventually receives a corresponding RESPONSE.

The PNRP node also honors cache synchronization requests. Upon receiving a SOLICIT packet, the node responds with an ADVERTISE packet, listing the PNRP IDs in its highest cache level. The solicitor node then sends a REQUEST listing the PNRP IDs for any ADVERTISE'd PACs it wants. Each REQUESTed cache entry is then FLOODed to the REQUESTor. Finally, and as will be discussed more fully below, the PNRP also performs identity validation. Identity validation is a threat mitigation device used to validate PACs. Identity validation basically has two purposes. First, identity validation ensures that the PNRP node specified in a PAC has the PNRP ID from that PAC locally registered. Second, for secure PNRP IDs (discussed below), identity validation ensures that the PAC was signed using a key with a cryptographically provable relationship to the authority in the PNRP ID.

Having now provided a working knowledge of the PNRP system for which an embodiment of the security infrastructure of the present invention finds particular relevance, attention is now turned to the security mechanisms provided by the security infrastructure of the present invention. These mechanisms are provided by the system of the present invention to eliminate, or at a minimum mitigate, the effect of the various attacks that may be posed by a malicious node in a P2P cloud as discussed above. The PNRP protocol does not have any mechanism to prevent these attacks, nor is there a single solution to address all of these threats. The security infrastructure of the present invention, however, minimizes the disruption that may be caused by a malicious node, and may be incorporated into the PNRP protocol.

As with many successful P2P protocols, entities can be published for easy discovery. To provide security and integrity to the P2P protocol, however, each identity preferably includes an attached identity certificate. However, a robust security architecture will be able to handle both secure and insecure entities. In accordance with an embodiment of the present invention, this robustness is provided through the use of self-verifying PACs.

A secure PAC is made self-verifying by providing a mapping between the ID and a public key. This will prevent anyone from publishing a secure PAC without having the private key to sign that PAC, and thus will prevent a large number of identity theft attacks. The keeper of the ID private key uses the certificate to attach additional information to the ID, such as the IP address, friendly name, etc. Preferably, each node generates its own pair of private-public keys, although such may be provided by a trusted supplier. The public key is then included as part of the node identifier. Only the node that created the pair of keys has the private key with which it can prove that it is the creator of the node identity. In this way, identity theft may be discovered, and is, therefore, deterred.

A generic format for such certificates may be represented as [Version, ID, <ID Related Info>, Validity, Algorithms, P.sub.Issuer]K.sub.Issuer. Indeed, P2P name/URL is part of the basic certificate format, regardless of whether it is a secure or insecure ID. As used in this certificate representation, Version is the certificate version, ID is the identifier to be published, <ID Related Info> represents information to be associated with the ID, Validity represents the period of validity expressed in a pair of From-To dates expressed as Universal Date Time (aka GMT), Algorithms refers to the algorithms used for generating the key pairs, and for signing, and P.sub.Issuer is the public key of the certificate issuer. If the certificate issuer is the same as the ID owner then this is P.sub.ID the public key of the ID owner. The term K.sub.Issuer is the private key corresponding to P.sub.Issuer. If the certificate issuer is the ID owner then this is K.sub.ID, the private key of the ID owner.

In a preferred embodiment, the <ID related info> comprises the address tuple where this ID can be found, and the address tuple for the PNRP service of the issuer. In this embodiment, the address certificate becomes [Version, ID, <Address>.sub.ID, <Address>.sub.PNRP, Validity, Revoke Flag, Algorithms, P.sub.Issuer]K.sub.Issuer. In this expanded representation, the ID is the identifier to be published, which can be a Group ID or Peer ID. The <Address> is the tuple of IPv6 address, port, and protocol. <Address>.sub.ID is the address tuple to be associated with the ID. <Address>.sub.PNRP is the address tuple of the PNRP service (or other P2P service) on the issuer machine. This is preferably the address of the PNRP address of the issuer and will be used by the other PNRP nodes to verify the validity of the certificate. Validity is the period of validity expressed in a pair of From-To dates. The Revoke Flag, when set, marks a revocation certificate. The P.sub.Issuer is the public key of the certificate issuer, and the K.sub.Issuer is the private key corresponding to P.sub.Issuer. If the certificate issuer is the ID owner then this is K.sub.ID, the private key of the ID.

In a preferred embodiment of the present invention, the following conditions have to be met for a certificate to be valid. The certificate signature must valid, and the certificate cannot be expired. That is, the current date expressed as UDT must be in the range specified by the Validity field. The hash of the public key must also match the ID. If the Issuer is the same as the ID owner then the hashing of the issuer's public key into the ID has to verify. If the P.sub.Issuer is different from P.sub.ID then there must be a chain of certificates leading to a certificate signed with K.sub.ID. Such a chain verifies the relationship between the issuer and the ID owner. Additionally, in the case when a certification revocation list (CRL) is published for that class of IDs and the CRL is accessible, then the authenticator can verify that none of the certificates in the chain appear in the CRL.

The security infrastructure of the present invention also handles insecure PACs. In accordance with the present invention, an insecure PAC is made self-verifying by including the uniform resource identifier (URI) from which the ID is derived. Indeed, both secure and insecure IDs include the URI in the PAC. The URI is of the format "p2p://URI". This will prevent a malicious node from publishing another node's secure ID in an insecure PAC.

The security infrastructure of the present invention also allows for the use of insecure IDs. The problem with insecure IDs is that they are very easy to forge: a malicious node can publish an insecure ID of any other node. Insecure IDs also open security holes wherein it becomes possible to make discovery of a good node difficult. However, by including a URI in accordance with the present invention, the insecure IDs cannot affect the secure IDs in any way. Further, the infrastructure of the present invention requires that the PACs containing insecure IDs be in the same format as secure PACs, i.e. they contain public key and private keys. By enforcing the same structure on both insecure PACs and secure PACs, the bar for generating PACs is not lowered. Further, by including a URI in the PAC it is not computationally feasible to generate a URI that maps to a specific secure ID.

One issue that arises is the timing of PAC verification, recognizing a trade off between increased P2P cloud security and increased overhead. The PAC contained in the various packets discussed above has to be verified at some point, however. This PAC verification includes checking the ID signature validity and checking if the ID corresponds to the public key for secure IDs. To balance the overhead versus security issues, one embodiment of the present invention verifies the PACs before any processing of that packet is done. This ensures that invalid data is never processed. However, recognizing that PAC verification may slow down the packet processing, which might not be suitable for certain classes of packets (e.g. RESOLVE packets), an alternate embodiment of the present invention does not verify the PAC in these packets.

In addition to PAC verification, the security infrastructure of the present invention also performs an ID ownership check to validate the PAC. As discussed above, identity theft can be discovered by simple validation of the address certificate before using that address in PNRP or other P2P protocols. This validation may entail simply verifying that the ID is the hash of the public key included in the certificate. The ownership validation may also entail the issuance of an INQUIRE packet to the address in that PAC. The INQUIRE packet will contain the ID to be verified, and a transaction ID. If the ID is present at that address, the node should acknowledge that INQUIRE. If the ID is not present at that address, the node should not acknowledge that INQUIRE. If the certificate chain is required to verify the identity, the node returns the complete certificate chain. While signature and ID->URL validation is still complex and a significant use of resources, as is validating the chain of trust in a supplied cert chain, the system of the present invention avoids any sort of challenge/response protocol, which would add an additional level of complexity to PAC validation. Further, the inclusion of the transaction ID prevents the malicious node from pre-generating the response to the INQUIREs. Additionally, this mechanism dispenses with the requirement that the PAC carry the complete certificate chain.

The ID ownership check is also facilitated in the system of the present invention by modifying the standard RESOLVE packet so that it can also perform the ID ownership check. This modified RESOLVE packet contains the ID of the address to which the RESOLVE is being forwarded. If the ID is at that address, it will send an ACK, otherwise it will send a NACK. If the ID does not process the RESOLVE or if a NACK is received, the ID is removed from the cache. In this way a PAC is validated without resorting to any sort of challenge/response protocol and without sending any special INQUIRE packet by, in essence, piggybacking an INQUIRE message with the RESOLVE. This piggybacking process will be discussed again below with respect to FIG. 2. This procedure makes it easy to flush out invalid or stale PACs.

This identity validation check happens at two different times. The first is when a node adds a PAC to one of its lowest two cache levels. PAC validity in the lowest two cache levels is critical to PNRP's ability to resolve PNRP IDs. Performing identity validation before adding a PAC to either of these two levels mitigates several attacks. ID ownership is not performed if the PAC is added to any higher level cache because of the turnover in these higher levels. It has been determined that nearly 85% of all PAC entries in the higher levels of cache are replaced or expire before they are ever used. As such, the probability of seeing any effect from having an invalid PAC in these higher levels is low enough not to justify performing the ID validation when they are entered.

When it is determined that an entry would belong in one of the two lowest cache levels, the PAC is placed in a set aside list until its identity can be validated. This first type of identity validation uses the INQUIRE message. Such an identity validation confirms a PAC is still valid (registered) at its originating node, and requests information to help validate authority of the originating node to publish that PAC. One flag in the INQUIRE message is defined for the 'flags' field, i.e. RF_SEND_CHAIN, that requests the receiver to send a certificate chain (if any exists) in an AUTHORITY response. If the receiver of the INQUIRE does not have authority to publish the PAC or if the PAC is no longer locally registered, the receiver simply drops the INQUIRE message. Since the local node does not receive a proper response via an AUTHROITY message, the bad PAC will never be entered into its cache, and therefore can have no malicious effect on its operation in the P2P cloud.

Figure 2:
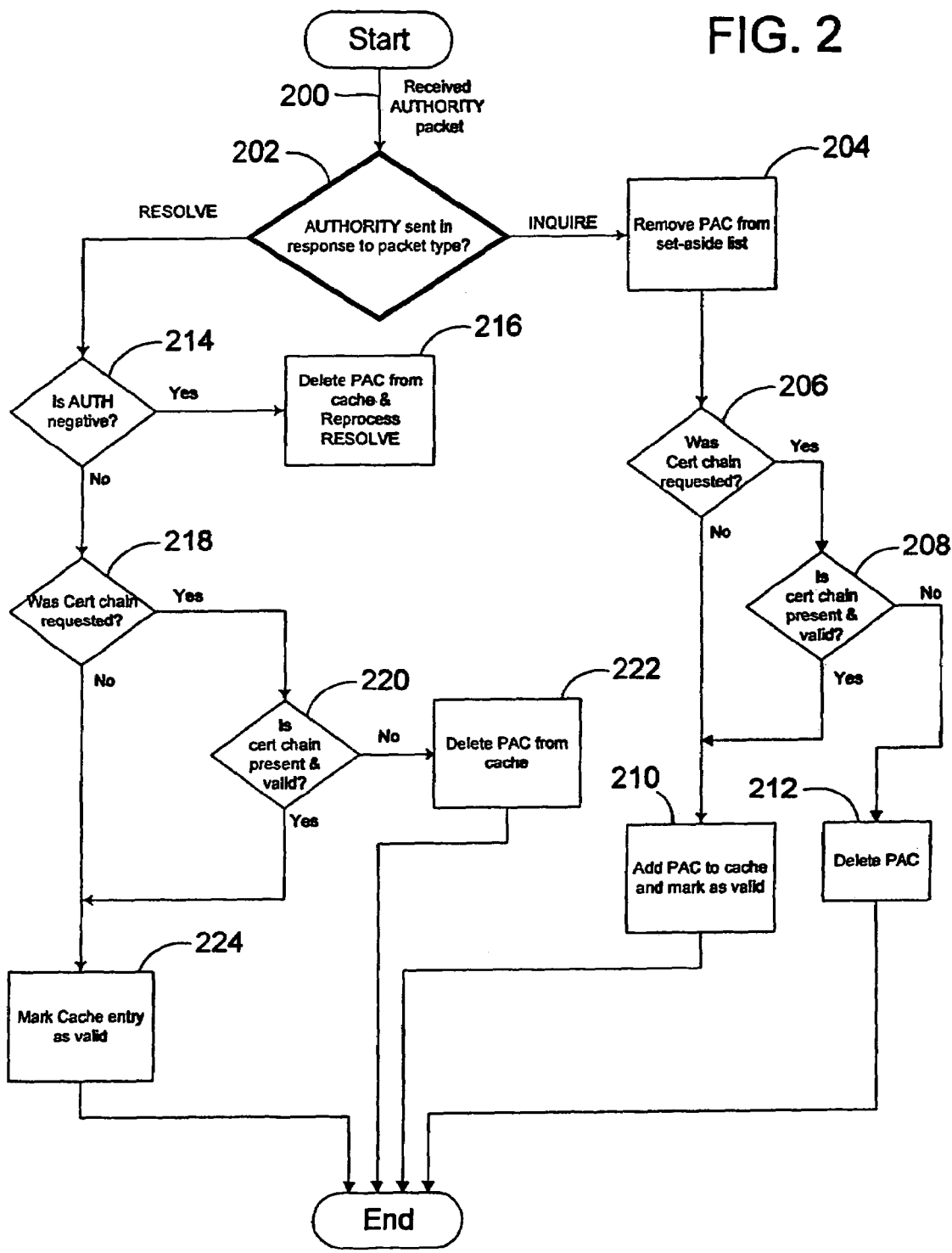
FIG. 2 is a simplified flow diagram illustrating security aspects of AUTHORITY packet processing in accordance with an embodiment of the present invention.

If the receiver of the INQUIRE does have the authority to issue the PAC and if it is still locally registered, that node will respond 200 to the INQUIRE message with an AUTHORITY message as illustrated in FIG. 2. While not illustrated in FIG. 2, the receiving node in an embodiment of the present invention checks to see if the AUTHORITY message says that the ID is still registered at the node which sent the AUTHORITY. Once the local node determines 202 that this AUTHORITY message is in response to the INQUIRE message, it removes the PAC from the set aside list 204. If the certificate chain was requested 206, the AUTHORITY message is checked to see if the certificate chain is present and valid 208. If the certificate chain is present and valid, then the PAC is added to the cache and marked as valid 210. Otherwise, the PAC is deleted 212. If the certificate chain was not requested 206, then the PAC is simply added to the cache and marked as valid 210.

As may now be apparent, this AUTHORITY message is used to confirm or deny that a PNRP ID is still registered at the local node, and optionally provides a certificate chain to allow the AUTHORITY recipient to validate the node's right to publish the PAC corresponding to the target ID. In addition to the INQUIRE message, the AUTHORITY message may be a proper response to a RESOLVE message as will be discussed below. The AUTHORITY message includes various flags that may be set by the receiving node to indicate a negative response. One such flag is the AF_REJECT_TOO_BUSY flag, which is only valid in response to a RESOLVE. This flag indicates that the host is too busy to accept a RESOLVE, and tells the sender that it should forward the RESOLVE elsewhere for processing. While not aiding in the identity validation, it is another security mechanism of the present invention to prevent a DoS attack as will be discussed more fully below. The flag AF_INVALID_SOURCE, which is only valid in response to a RESOLVE, indicates that the Source PAC in the RESOLVE is invalid. The AF_INVALID_BEST_MATCH flag, which is also only valid in response to a RESOLVE, indicates that the 'best match' PAC in the RESOLVE is invalid. The AF_UNKNOWN_ID flag indicates that the specified 'validate' PNRP ID is not registered at this host. Other flags in the AUTHORITY message indicate to the receiving node that requested information is included. The AF_CERT_CHAIN flag indicates that a certificate chain is included that will enable validation of the relationship between the 'validate' PNRP ID and the public key used to sign the PAC. The AUTHORITY message is only sent as an acknowledgement/response to either the INQUIRE or RESOLVE messages. If an AUTHORITY is ever received out of this context, it is discarded.

The second time that identity validation is performed is opportunistically during the RESOLVE process. As discussed, PNRP caches have a high rate of turnover. Consequently, most cache entries are overwritten in the cache before they are ever used. Therefore, the security infrastructure of the present invention does not validate these PACs until and unless they are actually used. When a PAC is used to route a RESOLVE path, the system of the present invention piggybacks identity validation on top of the RESOLVE packet as introduced above. The RESOLVE contains a 'next hop' ID which is treated the same as the 'target ID' in an INQUIRE packet. This RESOLVE is then acknowledged with an AUTHORITY packet, the same as is expected for an INQUIRE discussed above. If an opportunistic identity validation fails, the receiver of the RESOLVE is not who the sender believes they are. Consequently, the RESOLVE is routed elsewhere and the invalid PAC is removed from the cache.

This process is also illustrated in FIG. 2. When a PNRP node P receives an AUTHORITY packet 200 with the header Message Type field set to RESOLVE 202, the receiving node examines the AUTHORITY flags to determine if this AUTHORITY flag is negative 214, as discussed above. If any of the negative response flags are set in the AUTHORITY message, the PAC is deleted 216 from the cache and the RESOLVE is routed elsewhere. The address to which the RESOLVE was sent is appended to the RESOLVE path and marked REJECTED. The RESOLVE is then forwarded to a new destination. If the AUTHORITY is not negative and if the certificate chain was requested 218, the AUTHORITY message flag AF_CERT_CHAIN is checked to see if the certificate chain is present. If it is present the receiving node should perform a chain validation operation on the cached PAC for the PNRP ID specified in validate. The chain should be checked to ensure all certificates in it are valid, and the relationship between the root and leaf of the chain is valid. The hash of the public key for the chain root should, at a minimum, be compared to the authority in the PACs P2P name to ensure they match. The public key for the chain leaf should be compared against the key used to sign the PAC to ensure they match. If any of these checks fail or if the certificate chain is not present when requested 220, the PAC should be removed from the cache 222 and the RESOLVE reprocessed. If the requested certificate chain is included and is validated 220, the PAC corresponding to the validate PNRP ID should be marked as fully validated 224. If desired, the PNRP ID, PNRP service address, and validation times may be retained from the PAC and the PAC itself deleted from the cache to save memory.

As an example of this identity validation, assume that 'P' is a node requesting an identity validation for PNRP ID 'T'. 'N' is the node receiving the identity validation request. This could happen as a result of P receiving either an INQUIRE packet with target ID=T, or a RESOLVE packet with next hop=T. N checks its list of PNRP IDs registered locally. If T is not in that list, then the received packet type is checked. If it was an INQUIRE, N silently drops the INQUIRE request. After normal retransmission attempts expire, P will discard the PAC as invalid and processing is done. If it was a RESOLVE, N responds with an AUTHORITY packet indicating ID T is not locally registered. P then sends the RESOLVE elsewhere. If T is in the list of PNRP IDs at N, N constructs an AUTHORITY packet and sets the target ID to T. If T is an insecure ID, then N sends the AUTHORITY packet to P. If T is a secure ID, and the authority for the secure ID is the key used to sign the PAC, then N sends the AUTHORITY packet to P. If neither of these are true and if the RF_SEND_CHAIN flag is set, then N retrieves the certificate chain relating the key used to sign the PAC to the authority for PNRP ID T. The certificate chain is inserted into the AUTHORITY packet, and then N sends the AUTHORITY packet to P. At this point, if T is an insecure ID processing is completed. Otherwise, P validates the relationship between the PAC signing key and the authority used to generate the PNRP ID T. If the validation fails, the PAC is discarded. If validation fails and the initiating message was a RESOLVE, P forwards the RESOLVE elsewhere.

As may now be apparent from these two times that identity ownership verification is performed, through either the INQUIRE or the modified RESOLVE packet, an invalid PAC cannot be populated throughout the P2P cloud using a FLOOD, and searches will not be forwarded to non-existent or invalid IDs. The PAC validation is necessary for FLOOD because, if the FLOOD packet is allowed to propagate in the network without any validation, then a DoS attack may result. Through these mechanisms, a popular node will not be flooded with ID ownership check because its ID will belong to only a very few nodes' lowest two cache levels.

As described more fully in the above referenced co-pending application, a PNRP node N learns about a new ID in one of four ways. It may learn of a new ID through the initial flooding of a neighbor's cache. Specifically, when a P2P node comes up it contacts another node member of the P2P cloud and initiates a cache synchronization sequence. It may also learn of a new ID as a result of a neighbor flooding a new record of its lowest cache. For example, assume that node N appears as an entry in the lowest level cache of node M. When M learns about a new ID, if the ID fits in its lowest level cache, it will flood it to the other entries in that cache level, respectively to N. A node may also learn of a new ID as a result of a search request. The originator of a search request inserts its address certificate in the request, and the PAC for the 'best match' to the search request so far also inserts its PAC into the request. In this way, all of the nodes along the search request path will update their cache with the search originator's address, and the best match's address. Similarly, a node may learn of a new ID as a result of a search response. The result of a search request travels a subset of the request path in reverse order. The nodes along this path update their cache with the search result.

According to PNRP, when the node first comes up it discovers a neighbor. As discussed above, however, if the node that is first discovered is a malicious node, the new node can be controlled by the malicious node. To prevent or minimize the possibility of such occurrence, the security infrastructure of the present invention provides two mechanisms to ensure secure node boot up. The first is randomized discovery. When a node tries to discover another node that will allow it to join the PNRP cloud, the last choice for discovery is using multicast/broadcast because it is the most insecure discovery method of PNRP. Due to the nature of discovery it is very difficult to distinguish between a good and bad node. Therefore, when this multicast/broadcast method is required, the security infrastructure of the present invention causes the node to randomly select one of the nodes who responded to the broadcast discovery message (MARCOPOLO or an existing multicast discovery protocol e.g., SSDP). By selecting a random node, the system of the present invention minimizes the probability of selecting a malicious node. The system of the present invention also performs this discovery without using any of its IDs. By not using IDs during discovery, the system of the present invention prevents the malicious node from targeting a specific ID.

Figure 3:
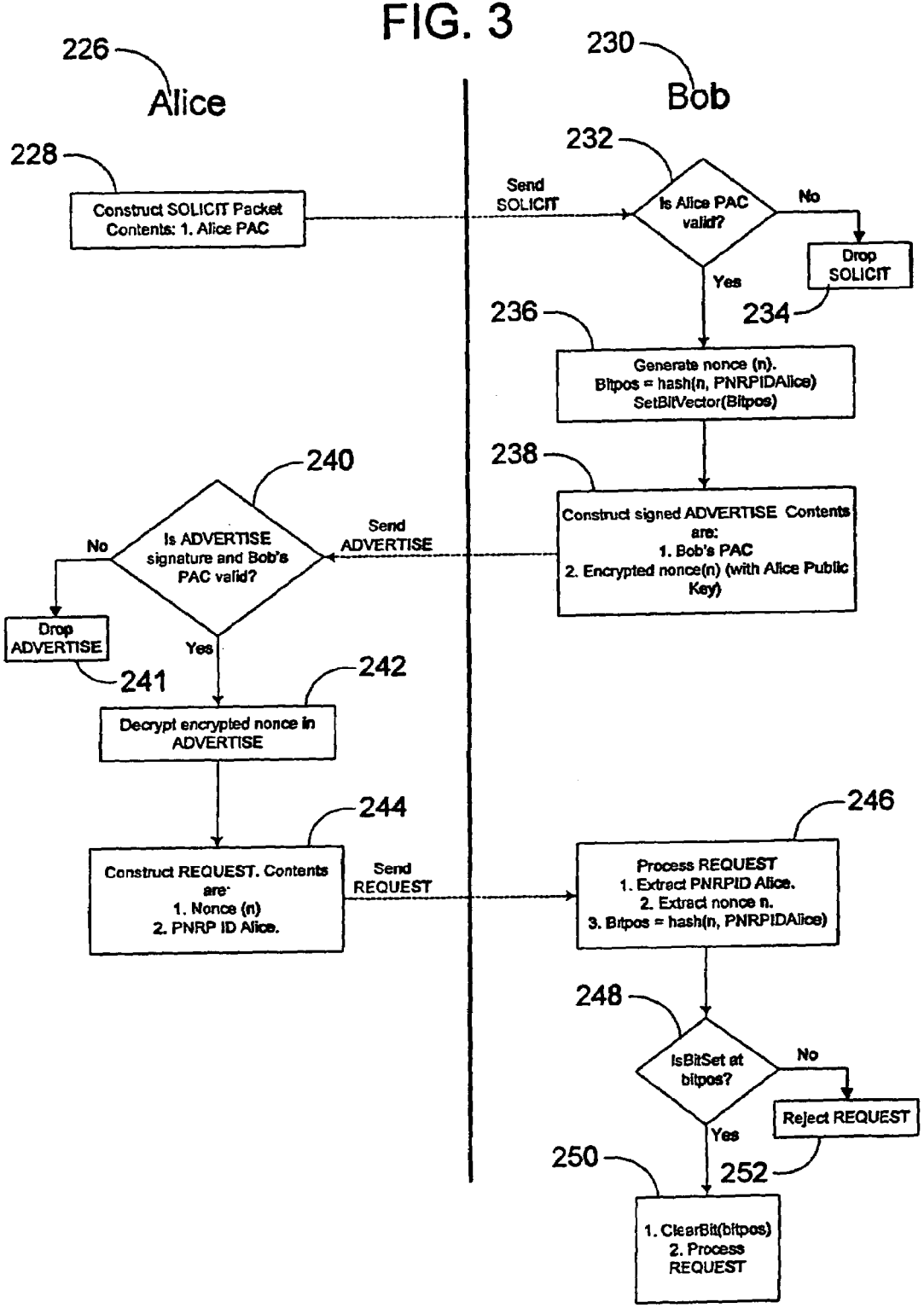
FIG. 3 is a simplified communications processing flow diagram illustrating security aspects of a synchronization phase of P2P discovery in accordance with an embodiment of the present invention.

A second secure node boot up mechanism is provided by a modified sync phase during which the node will maintain a bit vector. This modified synch phase mechanism may best be understood through an example illustrated in the simplified flow diagram of FIG. 3. Assume that Alice 226 sends a SOLICIT 228 to Bob 230 with her PAC in it. If Alice's PAC is not valid 232, Bob 230 simply drops the SOLICIT 234. If the PAC is valid, Bob 230 will then maintain a bit vector for storing the state of this connection. When this SOLICIT is received, Bob 230 generates 236 a nonce and hashes it with Alice's PNRP ID. The resulting number will be used as an index in this bit vector that Bob will set. Bob 230 then responds 238 to Alice 226 with an ADVERTISE message. This ADVERTISE will contain Bob's PAC and a nonce encrypted with Alice's public key, apart from other information, and will be signed by Bob 230. When Alice 226 receives this ADVERTISE, she verifies 240 the signature and Bob's PAC. If it cannot be verified, it is dropped 241. If it can be verified, Alice 226 then decrypts 242 the nonce. Alice 226 will then generate 244 a REQUEST that will contain this nonce and Alice's PNRP ID. Bob 230 will process 246 this REQUEST by hashing Alice's PNRP ID with the nonce sent in the REQUEST packet. If 248 the bit is set in the bit vector having the hashed results as an index, then Bob will clear the bits and start processing the REQUEST 250. Otherwise, Bob will ignore the REQUEST 252 as it may be a replay attack.

This makes the node boot up a secure process because the sequence cannot be replayed. It requires minimal overhead in terms of resources consumed, including CPU, network ports, and network traffic. No timers are required to be maintained for the state information, and only the ID that initiated the sync up will be sent data. Indeed, this modified sync phase is asynchronous, which allows a node to process multiple SOLICITs simultaneously.

Many of the threats discussed above can be minimized by controlling the rate at which the packets are processed, i.e. limiting node resource consumption. The idea behind this is that a node should not consume 100% of its CPU trying to process the PNRP packets. Therefore, in accordance with an embodiment of the present invention a node may reject processing of certain messages when it senses that such processing will hinder its ability to function effectively.

Figure 4:
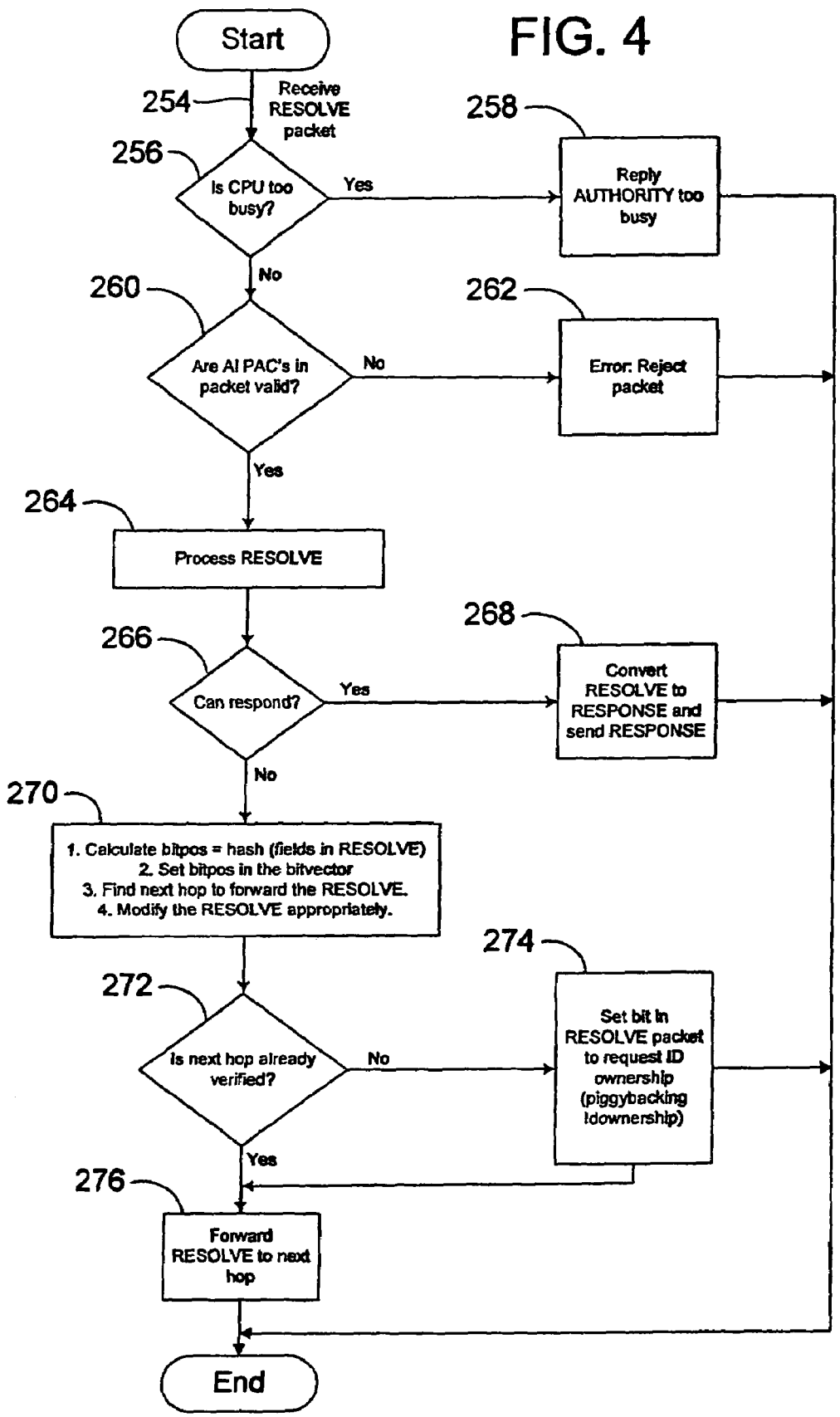
FIG. 4 is a simplified flow diagram illustrating security aspects of RESOLVE packet processing in accordance with an embodiment of the present invention.

One such message that the node may decide not to process is the RESOLVE message received from another node. This process is illustrated in simplified form in FIG. 4. Once a RESOLVE message is received 254, the node will check 256 to see if it is currently operating at a CPU capacity greater than a predetermined limit. If its CPU is too busy to process the RESOLVE message, it will send 258 an AUTHORITY message with the AF_REJECT_TOO_BUSY flag set indicating its failure to process the request because it is too busy. If the CPU is not too busy 256, the node will determine 260 if all of the PACs in the RESOLVE message are valid, and will reject 262 the message if any are found to be invalid. If all of the PACs are valid 260, the node will process 264 the RESOLVE.

If the node can respond 266 to the RESOLVE, the node will 268 convert the RESOLVE into a RESPONSE and send it to the node from which it received the RESOLVE. If, however, the target ID is not locally registered, the node will 270 calculate the bitpos as the hash of the fields in the RESOLVE and will set the corresponding bitpos in the bit vector. As discussed briefly above, this bit vector is used as a security mechanism to prevent the processing of erroneous reply messages when the node has not sent out any messages to which a reply is expected. The node finds the next hop to which to forward the RESOLVE, with the appropriate modifications to evidence its processing of the message. If 272 the node to which the RESOLVE is to be forwarded has already been verified, the node simply forwards 276 the RESOLVE to that next hop. If 272 this selected next hop has not yet been verified, the node piggybacks 274 an ID ownership request on the RESOLVE and forwards 276 it to that node. In response to the piggybacked ID ownership request, the node will expect to receive an AUTHORITY message as discussed above, the process for which is illustrated in FIG. 2. As illustrated in FIG. 2, if a validating AUTHORITY is not received at step 214, the PAC of the node to which the RESOLVE was forwarded is deleted 216 from the cache and the RESOLVE is reprocessed from step 254 of FIG. 4.

Figure 5:
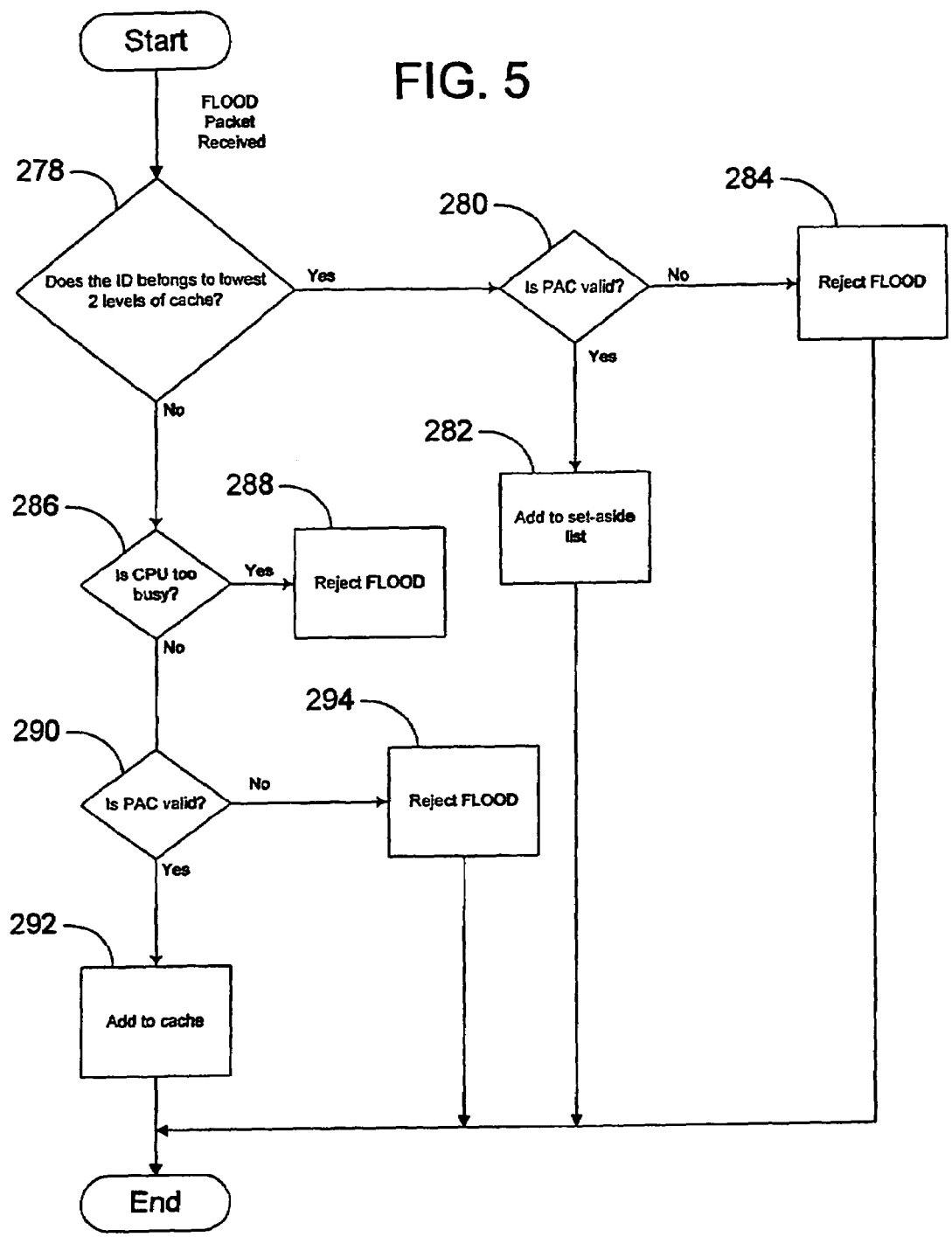
FIG. 5 is a simplified flow diagram illustrating security aspects of FLOOD packet processing in accordance with an embodiment of the present invention.

Another message that the node may decide not to process because its CPU is too busy is the FLOOD message. In this process, illustrated in simplified form in FIG. 5, if 278 the new information present in the FLOOD goes to either of the lowest two cache levels, the PAC is checked to determine if it is valid 280. If the PAC is not valid, the FLOOD is rejected 284. However, if the PAC is valid 280, it is put into a set-aside list 282. The entries in the set-aside list are taken at random intervals and are processed when the CPU is not too busy. Since these entries are going to be entered in the lowest two levels of cache, both the ID verification and the ownership validation are performed as discussed above. If 278 the new information present in the FLOOD goes to the higher cache levels and the CPU is too busy to process them 286, then they are discarded 288. If the node has available CPU processing capacity 286, the PAC is checked to determine if it is valid 290. If it is, then the PAC is added to the cache 292, otherwise the FLOOD is rejected 294.

Node boot up (SYNCHRONIZE) is another process that consumes considerable resources at a node, including not only CPU processing capacity but also network bandwidth. However, the synchronization process is required to allow a new node to fully participate in the P2P cloud. As such, the node will respond to the request from another node for the boot up if it has enough available resources at the given time. That is, as with the two messages just discussed, the node may refuse to participate in the boot up if its CPU utilization is too high. However, since this process consumes so much capacity, a malicious node can still exploit this by launching a large number of such sequences. As such, an embodiment of the security infrastructure of the present invention limits the number of node synchronizations that may be performed by a given node to prevent this attack. This limitation may additionally be time limited so that a malicious node cannot disable a node from ever performing such a synchronization again in the future.

Also discussed above were many search based attacks that could be launched or caused by a malicious node. To eliminate or minimize the effect of such search based attacks, the system of the present invention provides two mechanisms. The first is randomization. That is, when a node is searching for an appropriate next hop to which to forward a search request (RESOLVE), it identifies a number of possible candidate nodes and then randomly selects one ID out of these candidate IDs to which to forward the RESOLVE. In one embodiment, three candidate nodes are identified for the random selection. The IDs may be selected based on a weighted probability as an alternative to total randomization. One such method of calculating a weighted probability that the ID belongs to a non-malicious node is based on the distance of the PNRP ID from the target ID. The probability is then determined as an inverse proportionality to the ID distance between that node and the target node. In any event, this randomization will decrease the probability of sending the RESOLVE request to a malicious node.

The second security mechanism that is effective against search based attacks utilizes the bit vector discussed above to maintain state information. That is, a node maintains information identifying all of the RESOLVE messages that it has processed for which a response has not yet been received. The fields that are used to maintain the state information are the target ID and the address list in the RESOLVE packet. This second field is used to ensure that the address list has not been modified by a malicious node in an attempt to disrupt the search. As discussed above with the other instances of bit vector use, the node generates a hash of these fields from the RESOLVE and sets the corresponding bitpos in the bit vector to maintain a history of the processing of that RESOLVE.

Figure 6:
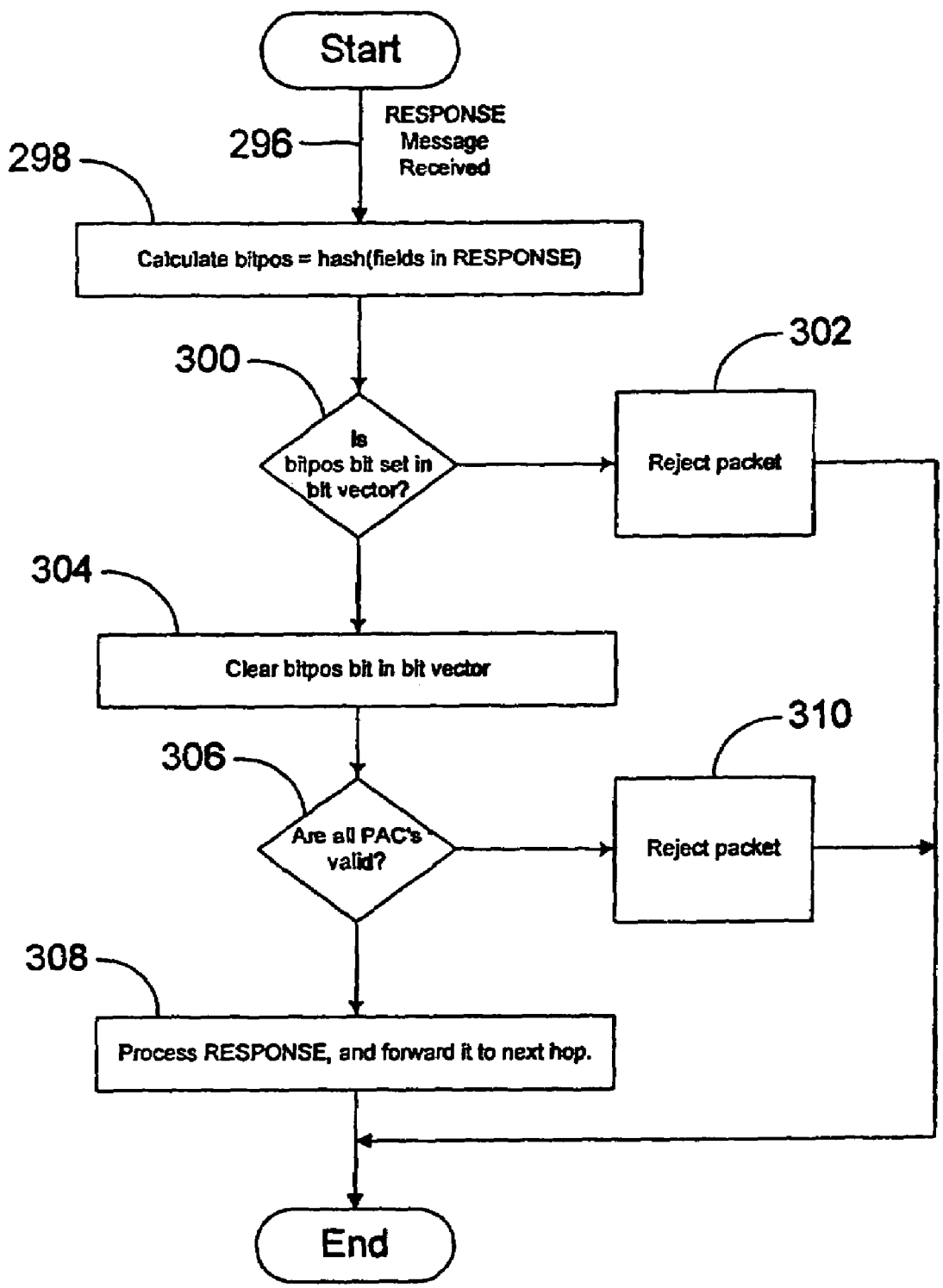
FIG. 6 is a simplified flow diagram illustrating security aspects of RESPONSE packet processing in accordance with an embodiment of the present invention.

As illustrated in the simplified flow diagram of FIG. 6, when a RESPONSE message is received 296 from another node, the fields in this RESPONSE message are hashed 298 to calculate the bitpos. The node then checks 300 the bit vector to see if the bitpos is set. If the bit is not set, meaning that this RESPONSE is not related to an earlier processed RESOLVE, then the packet is discarded 302. If the bitpos is set, meaning that this RESPONSE is related to an earlier processed RESOLVE, the bitpos is reset 304. By resetting the bitpos, the node will ignore further identical RESPONSE messages that may be sent as part of a playback attack from a malicious node. The node then checks to make sure that all of the PACs in the RESPONSE message are valid 306 before processing the RESPONSE and forwarding it to the next hop. If any of the PACs are invalid 306, then the node will reject 310 the packet.

The RESOLVE process mentions converting a RESOLVE request into a RESPONSE. This RESPONSE handling just discussed involves ensuring the RESPONSE corresponds to a recently received RESOLVE, and forwarding the RESPONSE on to the next hop specified. As an example, assume that node P receives a RESPONSE packet S containing a target PNRP ID, a BestMatch PAC, and a path listing the address of all nodes which processed the original RESOLVE before this node, ending with this node's own PNRP address. Node P acknowledges receipt of the RESPONSE with an ACK. Node P checks the RESPONSE path for its own address. Its address must be the last entry in the address list for this packet to be valid. Node P also checks its received bit vector to ensure that the RESPONSE matches a recently seen RESOLVE. If the RESPONSE does not match a field in the received bit vector, or if P's address is not the last address in the path list, the RESPONSE is silently dropped, and processing stops. P validates the Best-Match PAC and adds it to its local cache. If the BestMatch is invalid, the RESPONSE is silently dropped, and processing stops. P removes its address from the end of the RESPONSE path. It continues removing entries from the end of the RESPONSE path until the endmost entry has a flag set indicating a node that ACCEPTED the corresponding RESOLVE request. If the path is now empty, the corresponding RESOLVE originated locally. PNRP does an identity validation check on the BestMatch. If the identity validation check succeeds, the BestMatch is passed up to the request manager, else a failure indication is passed up. If the path is empty, processing is complete. If the path is not empty, the node forwards the RESPONSE packet to the endmost entry in the path list.

A need for a PNRP address certificate revocation exists whenever the published address certificate becomes invalid prior to the certificate expiration date (Validity/To field). Examples of such events are when a node is gracefully disconnecting from the P2P network, or when a node is leaving a group, etc. The revocation mechanism of the present invention utilizes the publishing of a revocation certificate. A revocation certificate has the Revoke Flag set, and the From date of the Validity field set to the current time (or the time at which the certificate is to become revoked) and the To field set to the same value as the previously advertised certificates. All the certificates for which all the following conditions are met are considered to be revoked: the certificate is signed by the same issuer; the ID matches the ID in the revocation certificate; the Address fields match the ones in the revocation certificate; the To date of the Validation field is the same as the To date of the Validation filed in the revocation certificate; and the From date of the Validation field precedes the From date of the Validation filed in the revocation certificate. Since the revocation certificate is signed, it ensures that a malicious node cannot disconnect anyone from the cloud.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A method of inhibiting a denial of service attack based on a synchronization process in a peer-to-peer network, comprising:

receiving a SOLICIT message at a second node, the SOLICIT message requesting cache synchronization from a first node and containing a first node peer address certificate (PAC);

examining the first node PAC to determine its validity at the second node;

dropping the SOLICIT message when the step of examining the first node PAC determines that the first node PAC is not valid;

generating first connection information specifically identifying the SOLICIT message with the first node;

maintaining the first connection information when examining the first node PAC determines that the first node PAC is valid;

generating second connection information specifically identifying a REQUEST message with the first node; and comparing the first connection information and the second connection information.

2. The method of claim 1, wherein the first connection information is maintained in a bit vector at the second node.

3. The method of claim 2, wherein generating first connection information specifically identifying the SOLICIT message with the first node comprises:

generating a nonce at the second node;

extracting a first node identification information from the SOLICIT message; and setting a bit at a first bitpos, the first bitpos comprising the index of the bit vector corresponding to a hash of the nonce and the first node identification information.

4. The method of claim 3, further comprising:

encrypting the nonce using a first node public key;

constructing an ADVERTISE message, the ADVERTISE message comprising a second node PAC and the encrypted nonce;

sending the ADVERTISE message to the first node;

validating the ADVERTISE message;

decrypting the encrypted nonce; and sending a REQUEST message from the first node to the second node if the ADVERTISE message is valid, the REQUEST message comprising the first node identification information and the decrypted nonce.

5. The method of claim 4, wherein generating the second connection information specifically identifying the REQUEST message with the first node further comprises:

extracting the nonce from the REQUEST message;

extracting a first node identification information from the REQUEST message; and calculating a second bitpos as the hash of the nonce and the first node identification information wherein the second bitpos corresponds to an index of a bit in the bit vector.

6. The method of claim 5, wherein comparing the first connection information and the second connection information further comprises determining if the bit at the second bitpos is set.

7. The method of claim 6, further comprising rejecting the REQUEST message when the bit at the second bitpos is not set.

8. The method of claim 2, wherein generating first connection information specifically identifying the SOLICIT message with the first node comprises:

generating a nonce at the second node; and setting a bit at a first bitpos, the first bitpos comprising the index of the bit vector corresponding to the nonce.

9. The method of claim 3, wherein the first node identification information is a first node PNRP ID.

10. A computer-readable medium comprising computer-executable instructions for inhibiting a denial of service attack based on a synchronization process in a peer-to-peer network, the computer-executable instructions comprising instructions for:
  receiving a SOLICIT message at a second node, the SOLICIT message requesting cache synchronization from a first node and containing a first node peer address certificate (PAC);
  examining the first node PAC to determine its validity at the second node;
  dropping the SOLICIT message when the step of examining the first node PAC determines that the first node PAC is not valid;
  generating a first connection information specifically identifying the SOLICIT message with the first node;
  maintaining the first connection information when the step of examining the first node PAC determines that the first node PAC is valid;
  generating a second connection information specifically identifying a REQUEST message with the first node; and
  comparing the first connection information and the second connection information.

11. The computer-readable medium of claim 10, wherein the first connection information is maintained in a first bit vector at the second node.

12. The computer-readable medium of claim 11, wherein the instructions for generating a first connection information specifically identifying the SOLICIT message with the first node comprises:
  generating a nonce at the second node;
  extracting a first node identification information from the SOLICIT message; and
  setting a bit at a first bitpos, the first bitpos comprising the index of the bit vector corresponding to a hash of the nonce and the first node identification information.

13. The computer-readable medium of claim 12, further comprising computer-executable instructions for:
  encrypting the nonce using a first node public key;
  constructing an ADVERTISE message, the ADVERTISE message comprising a second node PAC and the encrypted nonce;
  sending the ADVERTISE message to the first node;
  validating the ADVERTISE message;
  decrypting the encrypted nonce; and
  sending a REQUEST message from the first node to the second node if the ADVERTISE message is valid, the REQUEST message comprising the first node identification information and the decrypted nonce.

14. The computer-readable medium of claim 13, wherein the instructions for generating the second connection information specifically identifying the REQUEST message with the first node further comprises computer-executable instructions for:
  extracting the nonce from the REQUEST message;
  extracting a first node identification information from the REQUEST message; and
  calculating a second bitpos as the hash of the nonce and the first node identification information wherein the second bitpos corresponds to an index of a bit in the bit vector.

15. The computer-readable medium of claim 14, wherein the instructions for comparing the first connection information and the second connection information further comprises computer-executable instructions for determining if the bit at the second bitpos is set.

16. The computer-readable medium of claim 15, further comprising computer-executable instructions for rejecting the REQUEST message when the bit at the second bitpos is not set.

17. The computer-readable medium of claim 11, wherein the instructions for generating a first connection information specifically identifying the SOLICIT message with the first node comprise computer-executable instructions for:
  generating a nonce at the second node; and
  setting a bit at a first bitpos, the first bitpos comprising the index of the bit vector corresponding to the nonce.

18. The computer-readable medium of claim 10, wherein the first node identification information is a first node PNRP ID.

19. A method of inhibiting a denial of service attack based on a synchronization process in a peer-to-peer network comprising:
  receiving a SOLICIT message at a second node, the SOLICIT message requesting cache synchronization from a first node and containing a first node peer address certificate (PAC);
  examining the first node PAC to determine its validity at the second node;
  dropping the SOLICIT message when the step of examining the first node PAC determines that the first node PAC is not valid;
  generating first connection information specifically identifying the SOLICIT message with the first node, the first connection information maintained in a bit vector at the second node;
  generating a nonce at the second node;
  extracting a first node identification information from the SOLICIT message;
  setting a bit at a first bitpos, the first bitpos comprising the index of the bit vector corresponding to a hash of the nonce and the first node identification information;
  encrypting the nonce using a first node public key;
  constructing an ADVERTISE message, the ADVERTISE message comprising a second node PAC and the encrypted nonce;
  sending the ADVERTISE message to the first node;
  validating the ADVERTISE message;
  decrypting the encrypted nonce;
  sending a REQUEST message from the first node to the second node if the ADVERTISE message is valid, the REQUEST message comprising the first node identification information and the decrypted nonce;
  maintaining the first connection information when examining the first node PAC determines that the first node PAC is valid;
  generating second connection information specifically identifying a REQUEST message with the first node;
  extracting the nonce from the REQUEST message;
  extracting a first node identification information from the REQUEST message;
  calculating a second bitpos as the hash of the nonce and the first node identification information wherein the second bitpos corresponds to an index of a bit in the bit vector;
  comparing the first connection information and the second connection information;
  determining if the bit at the second bitpos is set; and
  rejecting the REQUEST message when the bit at the second bitpos is not set.

20. The method of claim 19, wherein the first bitpos comprises the index of the bit vector corresponding to the nonce.

* * * * *